United States Patent
Kato et al.

(10) Patent No.: US 8,461,454 B2
(45) Date of Patent: Jun. 11, 2013

(54) AQUEOUS ABSORPTIVE POLYMER-CONTAINING RESIN COMPOSITION-PRODUCING METHOD, AQUEOUS ABSORPTIVE POLYMER-CONTAINING RESIN COMPOSITION, AND POROUS SUBSTANCE-PRODUCING METHOD USING SAME AND POROUS SUBSTANCE, INSULATED ELECTRIC CABLE-PRODUCING METHOD, INSULATED ELECTRIC CABLE AND COAXIAL CABLE

(75) Inventors: Yoshihisa Kato, Hitachi (JP); Seikichi Tanno, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 13/356,015

(22) Filed: Jan. 23, 2012

(65) Prior Publication Data

US 2012/0111600 A1    May 10, 2012

Related U.S. Application Data

(62) Division of application No. 12/562,567, filed on Sep. 18, 2009, now Pat. No. 8,129,439.

(30) Foreign Application Priority Data

Feb. 19, 2009 (JP) .................. 2009-036851
Aug. 12, 2009 (JP) .................. 2009-187019

(51) Int. Cl.
    *H01B 3/30*    (2006.01)
    *C08J 9/00*    (2006.01)
    *C08J 9/28*    (2006.01)

(52) U.S. Cl.
    USPC .......... 174/110 R; 174/110 SR; 174/110 AR; 521/64; 521/99; 521/117; 521/130; 521/187

(58) Field of Classification Search
    USPC ........ 521/64, 99, 117, 130, 137, 187; 524/84; 174/110 R, 110 SR, 110 AR
    See application file for complete search history.

(56) References Cited

U.S. PATENT DOCUMENTS

| 4,985,467 A | 1/1991 | Kelly et al. |
| 6,103,317 A | 8/2000 | Asai et al. |

FOREIGN PATENT DOCUMENTS

| JP | 11-176262 | 7/1999 |
| JP | 2003-026846 | 1/2003 |
| WO | WO01/92433 | 12/2001 |

*Primary Examiner* — Irina S Zemel
(74) *Attorney, Agent, or Firm* — Scully, Scott, Murphy & Presser, P.C.

(57) ABSTRACT

A method for producing an aqueous absorptive polymer-containing resin composition in which a resin composition is doped with an aqueous absorptive polymer includes causing the aqueous absorptive polymer to absorb and be swollen by water beforehand, and milling and microparticulating the water-absorbed and -swollen absorptive polymer at an ultrasonic flow pressure of not less than 50 MPa.

11 Claims, 5 Drawing Sheets

- 12 COAXIAL CABLE
- 10 POROUS FILM-SHEATHED ELECTRIC CABLE
- 1 INSULATING SHEATH LAYER
- 5 SHIELD WIRE
- 2 MICROPORES
- 3 CONDUCTOR
- 6 SHEATH LAYER

AQUEOUS ABSORPTIVE POLYMER-CONTAINING RESIN COMPOSITION-PRODUCING METHOD, AQUEOUS ABSORPTIVE POLYMER-CONTAINING RESIN COMPOSITION, AND POROUS SUBSTANCE-PRODUCING METHOD USING SAME AND POROUS SUBSTANCE, INSULATED ELECTRIC CABLE-PRODUCING METHOD, INSULATED ELECTRIC CABLE AND COAXIAL CABLE

CROSS REFERENCE TO RELATED APPLICATION

The present application is a divisional application of U.S. patent application Ser. No. 12/562,567 filed on Sep. 18, 2009 and claims the benefit of priority from Japanese patent application No. 2009-036851 filed on Feb. 19, 2009, the entire contents of each of which are incorporated herein by reference.

BACKGROUND OF THE INVENTION

1. Field of the Invention

The present invention relates to an aqueous absorptive polymer-containing resin composition-producing method, an aqueous absorptive polymer-containing resin composition, and a porous substance-producing method using the aqueous absorptive polymer-containing resin composition and a porous substance, an insulated electric cable-producing method, an insulated electric cable and a coaxial cable.

2. Description of the Related Art

In recent years, with continuing miniaturization and high-density packaging of medical precision electronic equipment and communications equipment, electric wires/cables to be used therein are also increasingly designed to be thinned in diameter. Further, for signal lines and the like, there is a notable tendency to demand higher-speed transmission signals, and it is therefore desired that an insulator layer for electric wires to be used in the signal lines is thin and has as low a dielectric constant as possible so that transmission signals are thereby designed to be high-speed.

This insulator conventionally uses a foamed low-dielectric constant insulating material such as polyethylene, fluororesin, or the like. As the foamed insulator layer formation, there are known methods by winding or extruding a foamed film around a conductor, especially the method by extrusion is widely used.

The foaming method is broadly divided into physically- and chemically-foaming methods.

As the physically foaming method, there are a method by injecting into a melted resin a volatile foaming liquid such as liquid CFC to thereby cause its evaporating pressure for foaming, a method by injecting a foaming gas, such as nitrogen gas, carbon dioxide, or the like, directly into a melted resin in an extruder, to thereby produce uniformly distributed cellular micro closed cell foams in the resin, and so on.

As the chemically foaming method, it is well-known that by dispersing and mixing a foaming agent in a resin, the resin is molded and subsequently heated to thereby decompose the foaming agent to produce foaming gas.

For the physically foaming method, refer to JP-A-2003-26846, and for the chemically foaming method, refer to JP-A-11-176262.

However, the method by injecting into a melted resin a volatile foaming liquid has the limits of molding thin because of strong evaporating pressure, and difficulty in micro bubble formation or homogenous formation. Also, there is the problem of slow speed of injecting a volatile foaming liquid, therefore difficulty in high-speed producing, and poor productivity. Further, the method by injecting a foaming gas directly into a melted resin in an extruder has the limits of extruding thin diameter and thinning, and the problem of special facilities or techniques required for safety, therefore poor productivity or high producing cost.

On the other hand, the chemically foaming method has the problem that because by kneading, dispersing and mixing a foaming agent beforehand, the resin is molded and subsequently heated to thereby decompose the foaming agent to produce foaming gas, the resin molding temperature has to be held at a lower temperature than the foaming agent decomposition temperature. Further, there is another problem that a thin wire diameter tends to cause the wire to be broken by resin pressure in covering by extrusion, and therefore makes high-speed signal transmission difficult.

Also, the physical foaming using CFC, butane, carbon dioxide, or the like has the problem of large environmental loads, and the chemically foaming has the problem of high prices of foaming agents to be used.

SUMMARY OF THE INVENTION

Accordingly, it is an object of the present invention to provide a method for producing an aqueous absorptive polymer-containing resin composition used as an environment-friendly easy low-dielectric constant porous thin film layer-forming material, an aqueous absorptive polymer-containing resin composition, and a porous substance-producing method using the aqueous absorptive polymer-containing resin composition and a porous substance, and to provide a method for producing an insulated electric cable capable of facilitating homogenous micropore formation and thin diameter and thinning, an insulated electric cable and a coaxial cable.

(1) According to one embodiment of the invention, a method for producing an aqueous absorptive polymer-containing resin composition in which a resin composition is doped with an aqueous absorptive polymer comprises:

causing the aqueous absorptive polymer to absorb and be swollen by water beforehand, and milling and microparticulating the water-absorbed and -swollen absorptive polymer at an ultrasonic flow pressure of not less than 50 MPa.

(2) According to another embodiment of the invention, a method for producing an aqueous absorptive polymer-containing resin composition comprises:

doping a liquid cross link curable resin composition with an aqueous absorptive polymer which has absorbed and been swollen by water beforehand, and dispersing the aqueous absorptive polymer-containing resin composition at an ultrasonic flow pressure of not less than 50 MPa.

(3) According to another embodiment of the invention, an aqueous absorptive polymer-containing resin composition comprises:

a resin composition doped with an aqueous absorptive polymer, wherein the aqueous absorptive polymer is caused to absorb and be swollen by water beforehand, and milled and microparticulated at an ultrasonic flow pressure of not less than 50 MPa.

(4) According to another embodiment of the invention, a porous substance-producing method comprises:

cross-link curing an aqueous absorptive polymer-containing resin composition produced by doping a resin composition with an aqueous absorptive polymer, wherein the aqueous absorptive polymer is caused to absorb and be swollen by water beforehand, and milled and microparticulated at an ultrasonic flow pressure of not less than 50 MPa; and subsequently heating the aqueous absorptive polymer-containing resin composition to thereby remove moisture and form many pores.

In the embodiment (4), the following modifications and changes can be made.

(i) The heating uses microwave heating.

(5) According to another embodiment of the invention, a porous substance comprises:

an aqueous absorptive polymer-containing resin composition produced by doping a resin composition with an aqueous absorptive polymer, wherein the aqueous absorptive polymer is caused to absorb and be swollen by water beforehand, and milled and microparticulated at an ultrasonic flow pressure of not less than 50 MPa; and pores formed by cross-link curing and subsequently heating the aqueous absorptive polymer-containing resin composition to thereby remove moisture.

(6) According to another embodiment of the invention, an insulated electric cable-producing method comprises:

causing a conductor to be covered with an aqueous absorptive polymer-containing resin composition produced by doping a resin composition with an aqueous absorptive polymer, wherein the aqueous absorptive polymer is caused to absorb and be swollen by water beforehand, and milled and microparticulated at an ultrasonic flow pressure of not less than 50 MPa;

curing the aqueous absorptive polymer-containing resin composition; and subsequently heating the cured aqueous absorptive polymer-containing resin composition to remove moisture in the aqueous absorptive polymer and form an insulating sheath layer.

In the embodiment (6), the following modifications and changes can be made.

(ii) The insulating sheath layer is not more than 100 μm thick, and the porosity in the insulating sheath layer is 20%-60%.

(iii) The cross section of pores formed in the insulating sheath layer is substantially circular, its maximum to minimum diameter ratio is not more than 2, and the pore diameter D in thickness direction is formed to be D<½t where t is the thickness of the insulating sheath layer.

(iv) The heating uses microwave heating.

(7) According to another embodiment of the invention, an insulated electric cable comprises:

a conductor covered with an aqueous absorptive polymer-containing resin composition produced by doping a resin composition with an aqueous absorptive polymer, wherein the aqueous absorptive polymer is caused to absorb and be swollen by water beforehand, and milled and microparticulated at an ultrasonic flow pressure of not less than 50 MPa; and an insulating sheath layer formed by curing the aqueous absorptive polymer-containing resin composition, and subsequently heating the cured aqueous absorptive polymer-containing resin composition to remove moisture in the aqueous absorptive polymer.

(8) According to another embodiment of the invention, a coaxial cable comprises:

an insulated electric cable comprising a conductor covered with an aqueous absorptive polymer-containing resin composition produced by doping a resin composition with an aqueous absorptive polymer, wherein the aqueous absorptive polymer is caused to absorb and be swollen by water beforehand, and milled and microparticulated at an ultrasonic flow pressure of not less than 50 MPa; and an insulating sheath layer formed by curing the aqueous absorptive polymer-containing resin composition, and subsequently heating the cured aqueous absorptive polymer-containing resin composition to remove moisture in the aqueous absorptive polymer; and a shield layer provided around the insulated electric cable.

(9) According to another embodiment of the invention, an insulated electric cable-producing method comprises:

causing a conductor to be covered with an aqueous absorptive polymer-containing resin composition produced by doping a resin composition with an aqueous absorptive polymer, wherein the aqueous absorptive polymer is caused to absorb and be swollen by water beforehand, and milled and microparticulated at an ultrasonic flow pressure of not less than 50 MPa;

curing the aqueous absorptive polymer-containing resin composition to form an insulating sheath layer; and subsequently heating the insulating sheath layer to remove moisture in the aqueous absorptive polymer in the insulating sheath layer and form pores in the insulating sheath layer.

In the embodiment (9), the following modifications and changes can be made.

(v) The heating uses microwave heating.

Points of the Invention

According to one embodiment of the invention, an aqueous absorptive polymer-containing resin composition used as an insulating sheath layer of a porous film-sheathed electric cable is produced such that an absorptive polymer which has absorbed and been swollen by water beforehand is milled and microparticulated at an ultrasonic flow pressure of not less than 50 MPa, or such that an aqueous absorptive polymer-containing resin composition in which a liquid cross link curable resin composition is doped with an aqueous absorptive polymer which has absorbed and been swollen by water beforehand is dispersed at an ultrasonic flow pressure of not less than 50 MPa. The combination of the water-absorbed and swollen aqueous absorptive polymer and the high-pressure ultrasonic flow permits facilitation of microparticulating and homogenizing of the aqueous absorptive polymer. Dispersing this into the liquid cross link curable resin composition makes it possible to have homogenous micropores. The ultrasonic flow causes high pressure differences when cavities caused by ultrasonic flow collapse to thereby microscopically tear the water-absorbed, swollen and gelled aqueous absorptive polymer. In dispersing the water-absorbed and swollen absorptive polymer, the water-absorbed, swollen and gelled absorptive polymer contains much water, and when stirred and dispersed, tends to be dispersed in closed and spherical form because of immiscibility of the water and liquid cross link curable resin composition. This allows pores obtained by dehydration after curing to be formed in substantially spherical shape, which is collapse-resistant.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Below is described one embodiment according to the invention, referring to FIGS. 1-3.

Figure 1:
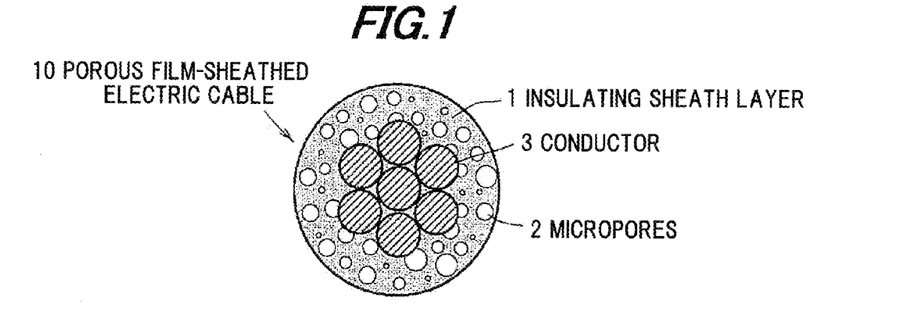
FIG. 1 is a cross-sectional view showing a porous film-sheathed electric cable according to the invention.
Figure 2:
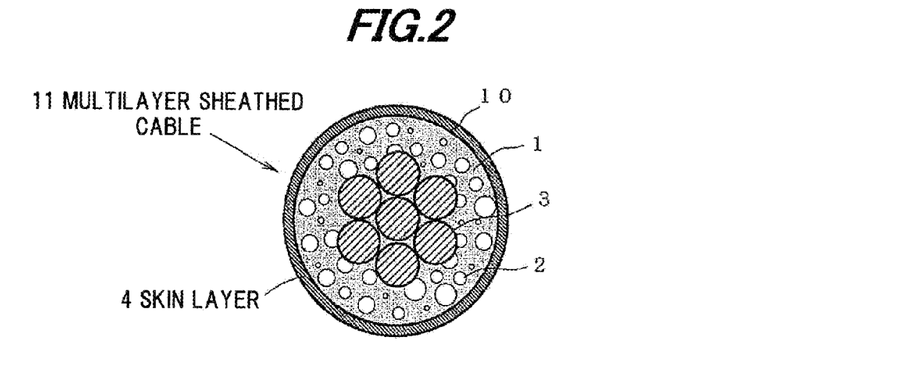
FIG. 2 is a cross-sectional view showing a multilayer sheathed cable using the porous film-sheathed electric cable according to the invention.
Figure 3:
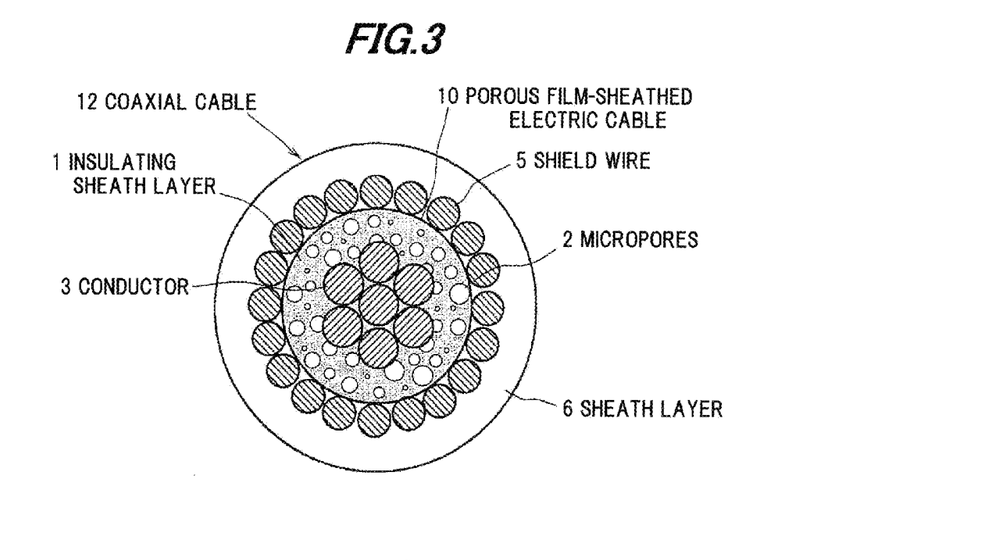
FIG. 3 is a cross-sectional view showing a coaxial cable using the porous film-sheathed electric cable according to the invention.

First are explained a porous film-sheathed electric cable, a multilayer sheathed cable, and a coaxial cable using an aqueous absorptive polymer-containing resin composition according to the invention, by way of FIGS. 1-3, respectively.

FIG. 1 is a cross-sectional view showing a porous film-sheathed electric cable 10. The porous film-sheathed electric cable 10 is formed by causing plural conductors 3 to be covered with an insulating sheath layer 1 formed of an aqueous absorptive polymer-containing resin composition having micropores 2.

FIG. 2 is a cross-sectional view showing a multilayer sheathed cable 11 using the porous film-sheathed electric cable 10 shown in FIG. 1. The multilayer sheathed cable 11 is formed by forming a skin layer or sheath layer 4 around the porous film-sheathed electric cable 10.

FIG. 3 is a cross-sectional view showing a coaxial cable 12 using the porous film-sheathed electric cable 10 shown in FIG. 1. The coaxial cable 12 is formed by forming the inner conductors 3 of the porous film-sheathed electric cable 10, and a shield wire or shield layer 5 around the porous film-sheathed electric cable 10, and further a sheath layer 6 therearound.

The aqueous absorptive polymer-containing resin composition used as the insulating sheath layer of the porous film-sheathed electric cable is formed by milling and microparticulating, at an ultrasonic flow pressure of not less than 50 MPa, an absorptive polymer which has absorbed and been swollen by water beforehand, or by dispersing, at an ultrasonic flow pressure of not less than 50 MPa, an aqueous absorptive polymer-containing resin composition in which a liquid cross link curable resin composition is doped with an aqueous absorptive polymer which has absorbed and been swollen by water beforehand.

The conductors 3 are covered with this aqueous absorptive polymer-containing resin composition therearound, followed by curing the aqueous absorptive polymer-containing resin composition, and subsequently heating the cured aqueous absorptive polymer-containing resin composition to remove moisture in the absorptive polymer and thereby form insulating sheath layer 1 with pores 2.

Generally absorptive polymers are polymer substances which absorb water very well, and because of its strong retention of moisture, do not discharge the absorbed water even if applying slight pressure. The aqueous absorptive polymer refers to this absorptive polymer which has absorbed water.

It is preferred that the absorptive polymer contains no sodium, and absorbs water not less than 20 g/g. As a typical example, there is polyalkyleneoxide-based resin. The reason for containing no sodium is because of reducing electrical insulation.

The water amount to be absorbed refers to a water amount (g) absorbed per 1 g absorptive polymer. The reason for the water amount to be absorbed being not less than 20 g/g is because smaller than 20 g/g water amount absorbed makes the pore-forming efficiency low or requires much use of absorptive polymer.

The liquid cross link curable resin composition refers to that cured by ultraviolet rays, heat, electron beams, visible light, or the like, and is not particularly limited thereto, but may preferably be a resin composition cross-link-curable by ultraviolet rays or heat, or both, more preferably an ultraviolet cross-link-curable resin composition.

The resin composition may use a known resin composition such as ethylene-, urethane-, silicon-, fluorine-, epoxy-, polyester-, polycarbonate-based resin composition, or the like, but may have a dielectric constant of not more than 4, preferably not more than 3.

The water content in the aqueous absorptive polymer-containing liquid cross link curable resin composition may be 20-70 wt %. This is because less than 20 wt % is unlikely to have the low dielectric constant effect. Also, it is because more than 70 wt % causes significant difficulty in stable porous film formation. It may preferably be 25-65 wt %.

The milling and microparticulating at an ultrasonic flow pressure of not less than 50 MPa can be achieved by using a commercial high-pressure homogenizer. The reason for not less than 50 MPa is because lower pressure than this makes the microparticulating low-efficiency due to weak milling effect, or time-consuming due to an increase in the number of times of processing. The combination of the water-absorbed and swollen aqueous absorptive polymer and the high-pressure ultrasonic flow permits facilitation of microparticulating and homogenizing of the aqueous absorptive polymer. Dispersing this into the liquid cross link curable resin composition makes it possible to have homogenous micropores. The reason for ultrasonic flow is because of causing high pressure differences when cavities caused by ultrasonic flow collapse to thereby microscopically tear the water-absorbed, swollen and gelled aqueous absorptive polymer.

Also, the high-pressure homogenizing of the aqueous absorptive polymer-containing liquid cross link curable resin composition permits microscopic, homogenous, and uniform dispersion of the aqueous absorptive polymer.

The reason for dispersing the water-absorbed and swollen absorptive polymer is that the water-absorbed, swollen and gelled absorptive polymer contains much water, and when stirred and dispersed, tends to be dispersed in closed and spherical form because of immiscibility of the water and liquid cross link curable resin composition. This allows pores obtained by dehydration after curing to be formed in substantially spherical shape, which is collapse-resistant.

The reason for thermal dehydration after cross link curing is because of preventing the reduction of porosity due to volume contraction by dehydration, and because of preventing variation of and stabilizing film thickness and diameter.

Further, the sheath with pores can be formed beforehand, therefore eliminating the need of causing foam, and allowing stabilization without any adhesion decrease due to expansion or separation between the conductor and the foaming layer likely to be caused in conventional gas foaming by gas injection or foaming agents.

The aqueous absorptive polymer-dispersed liquid cross link curable resin composition may be used by adding a known dispersing agent, leveling agent, coupling agent, coloring agent, flame retardant, antioxidant, electrical insulation enhancer, filler, etc.

In the invention, it is preferred that the thickness of insulating sheath layer 1 is not more than 100 μm, and that the porosity of insulating sheath layer 1 is not less than 20% and not more than 60%. Also, it is preferred that: pores 2 are spherical; its maximum to minimum diameter ratio is not more than 2; the selected aqueous absorptive polymer particle diameter d is $d<\frac{1}{2}t$; and the pore diameter D in thickness direction is $D<\frac{1}{2}t$ where t is the thickness of insulating sheath layer 1.

In coaxial cables such as medical probe cables which require thin diameter and high-speed transmission signals, a thin and low dielectric constant insulating sheath layer is essential. To this end, pore formation is effective in the low dielectric constant insulating sheath layer. However, too high porosity and too large pore diameter tend to cause the insulating sheath layer to collapse and make stable signal transmission impossible. Thus, defining the insulating sheath layer porosity, pore diameter D and insulating sheath layer thickness t as above allows the insulating sheath layer to be thin, and have a low dielectric constant and excellent collapse resistance.

The reason for the porosity being not less than 20% and not more than 60% is because less than 20% porosity has a poor effect on the low dielectric constant, and because more than 60% porosity tends to reduce insulating sheath layer moldability, collapse resistance, etc.

The reason for the maximum to minimum pore diameter ratio being not more than 2 is because more than 2 tends to cause collapse. The selected aqueous absorptive polymer particle diameter d is $d<\frac{1}{2}t$ (t: insulating sheath layer thickness). Also, the reason for the pore diameter D in thickness direction being $D<\frac{1}{2}t$ (t: insulating sheath layer thickness) is because greater than $\frac{1}{2}t$ tends to cause collapse at high porosities.

The aqueous absorptive polymer pore size or shape can be adjusted by pressure, the number of times of processing, etc., and easily controlled because the sheath can beforehand be formed with pores in its composition.

For thermal dehydration of water in the water-absorbed absorptive polymer, using microwave heating is preferred. The reason for using microwave heating is because water is rapidly heated by microwave and thermal dehydration can therefore be done for a short time without affecting the absorptive polymer and surrounding resin, to thereby efficiently form pores.

Also, use of a waveguide microwave heating furnace allows continuous thermal dehydration. Further, a typical heating furnace may be used together therewith.

Figure 10:
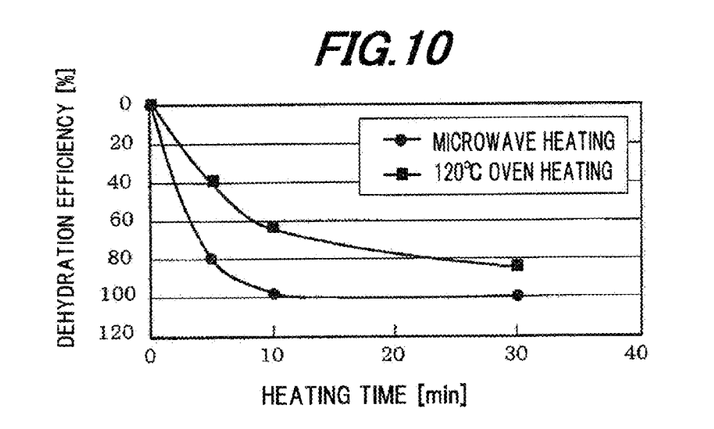
FIG. 10 is a diagram showing a comparison of dehydration efficiencies by microwave heating and 120° C. oven heating.

FIG. 10 shows the relationships between heating time and dehydration efficiency during thermal dehydration of water in an insulating sheath layer of an electric cable, by microwave heating and 120° C. oven heating, respectively.

From FIG. 10, it is found that the microwave heating is capable of efficient dehydration for a very short time, compared to the typical electric furnace or oven heating.

Although the insulating sheath layer of the electric cable has been described above, the porous substance (foamed substance) obtained from the aqueous absorptive polymer-containing resin composition of the invention may be applied to buffers, shock-absorbing films (sheets), light reflectors, etc.

Also, the liquid cross link curable resin composition allows porous layer formation on deformed surface.

Below are described Examples of the invention and Comparative Examples.

Table 1 shows resin composition A prepared as a liquid cross link curable resin composition (base resin composition).

TABLE 1

| | Resin composition A |
|---|---|
| Urethane acrylate oligomer *[1] | 100 |
| Dicyclopentanyldiacrylate *[2] | 10 |
| Dicyclopentanylacrylate *[3] | 40 |
| Isobonylacrylate *[4] | 30 |
| 2,4,6-trimethylbenzoyldiphenylphosphine oxide *[5] | 4 |
| 1-hydroxycyclohexylphenylketone *[6] | 2 |
| Cured substance dielectric constant (cavity resonance @ 10 GHz) | 2.65 |

*[1] M-1200 from TOAGOSEICo., Ltd.
*[2] R-684 from NIPPON KAYAKU Co., Ltd.
*[3] FA-513AS from HITACHICHEMICAL Co., Ltd.
*[4] IB-XA from KYOEISHA CHEMICAL Co., LTD
*[5] DAROCUR (registered trademark) TOP from CIBA SPECIALTY CHEMICALS
*[6] IRGACURE (registered trademark) 184 from CIBA SPECIALTY CHEMICALS The resin composition A is fabricated by using a 15 MIL blade and 500 mJ/cm$^2$ ultraviolet-curing an approximately 200 μm-thick film in a nitrogen atmosphere. Its dielectric constant obtained by cavity resonance (@ 10 GHz) is 2.65.

An aqueous absorptive polymer is prepared as follows.

The aqueous absorptive polymer is prepared by mixing a 50 μm-average particle diameter absorptive polymer (AQUA-COKE (registered trademark) TWP-PF from Sumitomo Seika Chemicals Co., Ltd.) and distilled water at the ratio of 1:31, and settling for 24 hours.

First, as Examples 1-4 and Comparative Example 1, the aqueous absorptive polymer is dispersed at ultrasonic flow velocity by varying pressure, stirred and dispersed into the resin composition A to form an aqueous absorptive polymer-containing resin composition. Also, as Example 5, the resin composition A and the aqueous absorptive polymer are stirred and dispersed, and subsequently dispersed at ultrasonic flow velocity by varying pressure to form an aqueous absorptive polymer-containing resin composition, and as Comparative Example 2, the resin composition A and the aqueous absorptive polymer are stirred and dispersed to form an aqueous absorptive polymer-containing resin composition.

Also, Comparative Example 3 uses a tetrafluoroethylene-perfluoro alkyl vinyl ether copolymer (PFA), which is a typical low dielectric constant material, as a thermoplastic resin to be extruded and molded.

Table 2 shows Examples 1-5 and Comparative Examples 1-3.

TABLE 2

| | | | Example | | | | | Comparative example | | |
|---|---|---|---|---|---|---|---|---|---|---|
| Item | | | 1 | 2 | 3 | 4 | 5 | 1 | 2 | 3 |
| Base resin composition | | | 100 | 100 | 100 | 100 | 100 | 100 | 100 | PFA |
| Aqueous absorptive polymer (TW-PF:water = 1:31) | 40 MPa × 1 time | | | | | | | 64 | | |
| | 60 MPa × 1 time | | 64 | | | | | | | |
| | 100 MPa × 1 time | | | 64 | | | | | | |
| | 130 MPa × 1 time | | | | 64 | | | | | |
| | 130 MPa × 3 times | | | | | 64 | | | | |
| Aqueous absorptive polymer | | | | | | | 64 | | 64 | |
| | Total | | 164 | 164 | 164 | 164 | 164 | 164 | 164 | — |
| | Water content (%) | | 37.8 | 37.8 | 37.8 | 37.8 | 37.8 | 37.8 | 37.8 | — |
| Film | Moldability | 50 μm | Good | Good | Good | Good | Good | Good | Good | — |
| | | 100 μm | Good | Good | Good | Good | Good | Good | Good | — |
| | | 200 μm | Good | Good | Good | Good | Good | Good | Good | — |
| | a/b | 200 μm | 1-1.9 | 1-1.5 | 1-1.3 | 1-1.2 | 1-1.2 | 1-2.3 | 1-3 | — |
| | Porosity after thermaldehydration (%) | 50 μm | 35.5 | 34.7 | 33.7 | 33.6 | 34 | <5 | <5 | — |
| | | 100 μm | 35.6 | 34.6 | 34 | 34.5 | 34.7 | 17.5 | 8.7 | — |
| | | 200 μm | 36.1 | 35 | 34.7 | 35.5 | 35.1 | 33.7 | 21 | — |
| | Dielectric constant @ 10 GHz cavity resonance | 200 μm | 1.94 | 1.96 | 1.96 | 1.95 | 1.96 | 1.99 | 2.22 | (2.02)*1 |
| | Average pore diameter (μm) | | 18.6 | 16.4 | 15 | 13.5 | 14.7 | 24.9 | 137 | — |
| | Pore diameter standard deviation | | 14.8 | 10.7 | 7 | 5.5 | 6 | 24 | 89 | — |
| Electric cable | t = 50 μm | Appearance | Good | Good | Good | Good | Good | Broken | Broken | Broken |
| | | Porosity (%) | 34.1 | 33.5 | 33 | 33.5 | 33.2 | — | — | — |
| | | a/b | 1-1.8 | 1-1.5 | 1-1.4 | 1-1.2 | 1-1.3 | — | — | — |
| | t = 100 μm | Appearance | Good | Good | Good | Good | Good | Poor | Broken | Broken |
| | | Porosity (%) | 34.5 | 34 | 33.4 | 34 | 34 | 15 | — | — |
| | | a/b | 1-1.7 | 1-1.6 | 1-1.3 | 1-1.2 | 1-1.3 | 1-2.4 | — | — |

*1( ) denotes 1 mm thickness data.

Examples and Comparative Examples in Table 2 are evaluated as follows.

Film Moldability

A 100 mm-wide and 200 mm-long coating film of the resin composition is formed on a glass sheet by using 4-MIL, 7-MIL, and 15-MIL blades and 500 mJ/cm² ultraviolet-cured in a nitrogen atmosphere by using an ultraviolet-applying conveyer, to check whether approximately 50, 100, and 200 μm-thick smooth films can be molded or not.

Porosity

The porosity is obtained from the following formula:

Porosity (%)=[1−(dehydrated sample weight/dehydrated sample volume)/(non-aqueous resin sample weight/non-aqueous resin sample volume)]×100

Dielectric Constant

For 3 film samples formed in a 2 mm-wide and 100 mm-long rectangular shape, their respective dielectric constants are measured at 10 GHz cavity resonance frequency, and the average thereof is obtained.

a/b

For not less than 10-μm pores observed in an electron microscope photograph of 5 film and electric cable sheath layer cross-section portions, maximum diameter a and minimum diameter b of the pore cross-sections are measured, and a/b is obtained.

Average Pore Diameter and Standard Deviation

For the electron microscope photograph of the 5 film and electric cable sheath layer cross-section portions, the average pore size in the image is obtained using an image-processing software "Win Roof" from MITSUTANI SHOJI, Inc. as average pore diameter. Also, the pore diameter standard deviation is obtained together therewith.

Next, Examples 1-5 and Comparative Examples 1-3 shown in Table 2 are explained in more detail.

EXAMPLE 1

64 parts by wt. of aqueous absorptive polymer processed at 600 MPa pressure, 1 time, using a high-pressure homogenizer (PANDA 2K TYPE from NiroSoavi Inc.) is added to 100 parts by wt. of resin composition A, followed by heating at 50° C. and stirring and dispersing at 500 rpm for 30 min, resulting in aqueous absorptive polymer-containing resin composition 1.

It is verified that the resin composition 1 has good film moldability. This resin composition 1 is heated for 5 min using a microwave heater (oscillatory frequency 2.45 GHz), followed by electron microscope observation of its cross section, which verifies that many pores are formed therein. For 3 films thereof, it is verified that the porosities obtained from film volume and weight after complete dehydration are 35.5%, 35.6%, and 36.1%, respectively, which substantially equal the water content. Also, for a 200 μm film thereof, cavity resonance measurement of its dielectric constant shows 1.94 (@ 10 GHz). Further, for pores observed in an electron microscope photograph of 5 cross-section portions of the 200-μm film, a/b measurement verifies that any of the pores formed has not more than 2, and is dispersed in a substantially spherical shape. The average pore diameter obtained from the cross-section photograph by the image-processing software is 18.6 μm, and the standard deviation is 14.8.

Subsequently, a conductor 48 AWG (7/0.013 S-MF-AG alloy wire, from Hitachi Cable, Ltd.) is covered with the resin composition 1 in a pressure coating tank at the speed of 50 m/min, followed by curing thereof in an ultraviolet-applying furnace (6 kW, 2 lamps from EYEGRAPHICS, Inc.), and subsequent thermal dehydration in a waveguide microwave heating furnace and an infrared heating furnace, resulting in 50 μm and 100 μm-thick-sheath electric cables. Cross-section observation thereof verifies that many pores are formed in the insulating sheath layer, and also that the porosities calculated from sheath layer volume and weight per 1 m are 34.1%, and 34.5%, respectively, which substantially equal the film results.

Further, for pores observed in an electron microscope photograph of 5 cross-section portions of the insulating sheath layer, a/b measurement verifies that any of the pores formed has not more than 2, and is dispersed in a substantially spherical shape.

Figure 4:
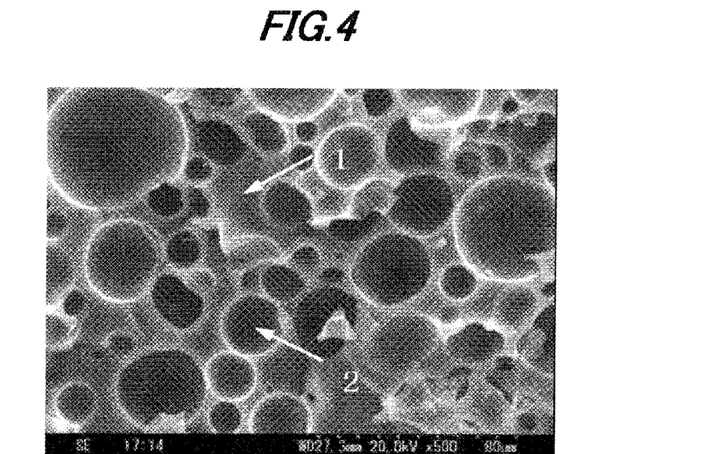
FIG. 4 is a 500 times-magnified microscopic photograph showing a 200 μm-thick film cross section fabricated in Example 1 according to the invention.

This electron microscopic photograph is shown in FIG. 4.

EXAMPLE 2

64 parts by wt. of aqueous absorptive polymer processed at 100 MPa pressure, 1 time, using a high-pressure homogenizer (PANDA 2K TYPE from NiroSoavi Inc.) is added to 100 parts by wt. of resin composition A, followed by heating at 50° C. and stirring and dispersing at 500 rpm for 30 min, resulting in aqueous absorptive polymer-containing resin composition 2.

It is verified that the resin composition 2 has good film moldability. This resin composition 1 is heated for 5 min using a microwave heater (oscillatory frequency 2.45 GHz), followed by electron microscope observation of its cross section, which verifies that many pores are formed therein. For 3 films thereof, it is verified that the porosities obtained from film volume and weight after complete dehydration are 34.7%, 34.6%, and 35%, respectively, which substantially equal the water content. Also, for a 200 µm film thereof, cavity resonance measurement of its dielectric constant shows 1.96 (@ 10 GHz). Further, for pores observed in an electron microscope photograph of 5 cross-section portions of the 200 µm film, a/b measurement verifies that any of the pores formed has not more than 2, and is dispersed in a substantially spherical shape. The average pore diameter obtained from the cross-section photograph by the image-processing software is 16.4 µm, and the standard deviation is 10.7.

Subsequently, a conductor 48 AWG (7/0.013 S-MF-AG alloy wire from Hitachi Cable, Ltd.) is covered with the resin composition 2 in a pressure coating tank at the speed of 50 in/min, followed by curing thereof in an ultraviolet-applying furnace (6 kW, 2 lamps from EYEGRAPHICS, Inc.), and subsequent thermal dehydration in a waveguide microwave heating furnace and an infrared heating furnace, resulting in 50 µm- and 100 µm-thick-sheath electric cables. Cross-section observation thereof verifies that many pores are formed in the insulating sheath layer, and also that the porosities calculated from sheath layer volume and weight per 1 m are 33.5%, and 34%, respectively, which substantially equal the film results.

Further, for pores observed in an electron microscope photograph of 5 cross-section portions of the insulating sheath layer, a/b measurement verifies that any of the pores formed has not more than 2, and is dispersed in a substantially spherical shape.

Figure 5:
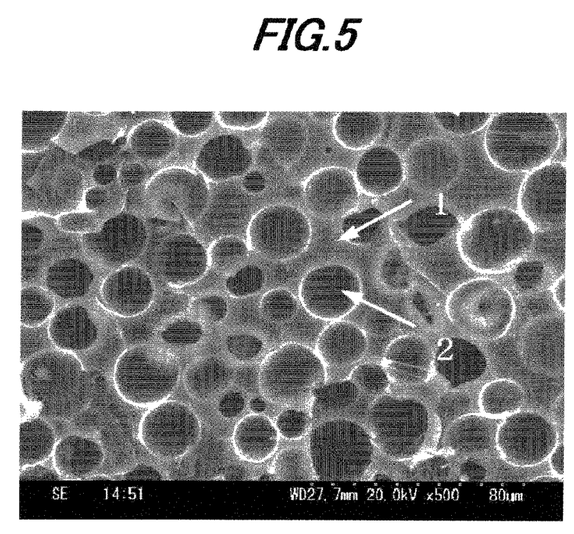
FIG. 5 is a 500 times-magnified microscopic photograph showing a 200 μm-thick film cross section fabricated in Example 2 according to the invention.

This electron microscopic photograph is shown in FIG. 5.

EXAMPLE 3

64 parts by wt. of aqueous absorptive polymer processed at 130 MPa pressure, 1 time, using a high-pressure homogenizer (PANDA 2K TYPE from NiroSoavi Inc.) is added to 100 parts by wt. of resin composition A, followed by heating at 50° C. and stirring and dispersing at 500 rpm for 30 min, resulting in aqueous absorptive polymer-containing resin composition 3.

It is verified that the resin composition 3 has good film moldability. This resin composition 1 is heated for 5 min using a microwave heater (oscillatory frequency 2.45 GHz), followed by electron microscope observation of its cross section, which verifies that many pores are formed therein. For 3 films thereof, it is verified that the porosities obtained from film volume and weight after complete dehydration are 33.7%, 34%, and 34.7%, respectively, which substantially equal the water content. Also, for a 200 µm film thereof, cavity resonance measurement of its dielectric constant shows 1.96 (@ 10 GHz). Further, for pores observed in an electron microscope photograph of 5 cross-section portions of the 200-µm film, a/b measurement verifies that any of the pores formed has not more than 2, and is dispersed in a substantially spherical shape. The average pore diameter obtained from the cross-section photograph by the image-processing software is 15 µm, and the standard deviation is 7.

Subsequently, a conductor 48 AWG (7/0.013 S-MF-AG alloy wire from Hitachi Cable, Ltd.) is covered with the resin composition 3 in a pressure coating tank at the speed of 50 m/min, followed by curing thereof in an ultraviolet-applying furnace (6 kW, 2 lamps from EYEGRAPHICS, Inc.), and subsequent thermal dehydration in a waveguide microwave heating furnace and an infrared heating furnace, resulting in 50 µm- and 100 µm-thick-sheath electric cables. Cross-section observation thereof verifies that many pores are formed in the insulating sheath layer, and also that the porosities calculated from sheath layer volume and weight per 1 m are 33%, and 34.4%, respectively, which substantially equal the film results. Further, for pores observed in an electron microscope photograph of 5 cross-section portions of the insulating sheath layer, a/b measurement verifies that any of the pores formed has not more than 2, and is dispersed in a substantially spherical shape.

Figure 6:
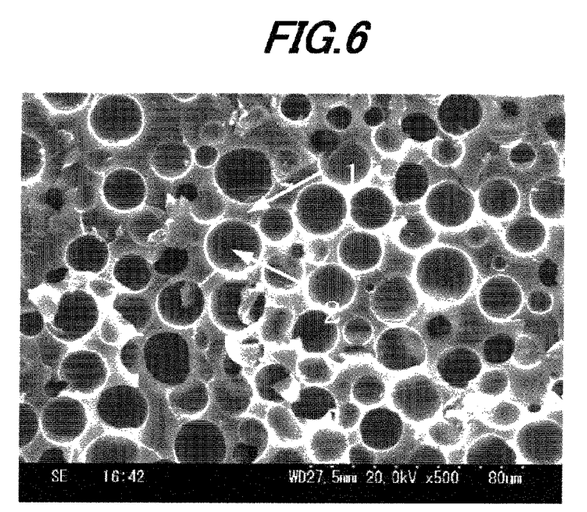
FIG. 6 is a 500 times-magnified microscopic photograph showing a 200 μm-thick film cross section fabricated in Example 3 according to the invention.

This electron microscopic photograph is shown in FIG. 6.

EXAMPLE 4

64 parts by wt. of aqueous absorptive polymer is added to 100 parts by wt. of resin composition A, followed by heating at 50° C. and stirring and dispersing at 500 rpm for 30 min, and subsequent processing at 130 MPa pressure, 3 times, using a high-pressure homogenizer (PANDA 2K TYPE from NiroSoavi Inc.), resulting in aqueous absorptive polymer-containing resin composition 4.

It is verified that the resin composition 4 has good film moldability. This resin composition 4 is heated for 5 min using a microwave heater (oscillatory frequency 2.45 GHz), followed by electron microscope observation of its cross section, which verifies that many pores are formed therein. For 3 films thereof, it is verified that the porosities obtained from film volume and weight after complete dehydration are 33.6%, 34.5%, and 35.5%, respectively, which substantially equal the water content. Also, for a 200 µm film thereof, cavity resonance measurement of its dielectric constant shows 1.95 (@ 10 GHz). Further, for pores observed in an electron microscope photograph of 5 cross-section portions of the 200-µm film, a/b measurement verifies that any of the pores formed has not more than 2, and is dispersed in a substantially spherical shape. The average pore diameter obtained from the cross-section photograph by the image-processing software is 13.5 µm, and the standard deviation is 5.5.

Subsequently, a conductor 48 AWG (7/0.013 S-MF-AG alloy wire from Hitachi Cable, Ltd.) is covered with the resin composition 4 in a pressure coating tank at the speed of 50 m/min, followed by curing thereof in an ultraviolet-applying furnace (6 kW, 2 lamps from EYEGRAPHICS, Inc.), and subsequent thermal dehydration in a waveguide microwave heating furnace and an infrared heating furnace, resulting in 50 μm- and 100 μm-thick-sheath electric cables. Cross-section observation thereof verifies that many pores are formed in the insulating sheath layer, and also that the porosities calculated from sheath layer volume and weight per 1 m are 33.5%, and 34%, respectively, which substantially equal the film results. Further, for pores observed in an electron microscope photograph of 5 cross-section portions of the insulating sheath layer, a/b measurement verifies that any of the pores formed has not more than 2, and is dispersed in a substantially spherical shape.

Figure 7:
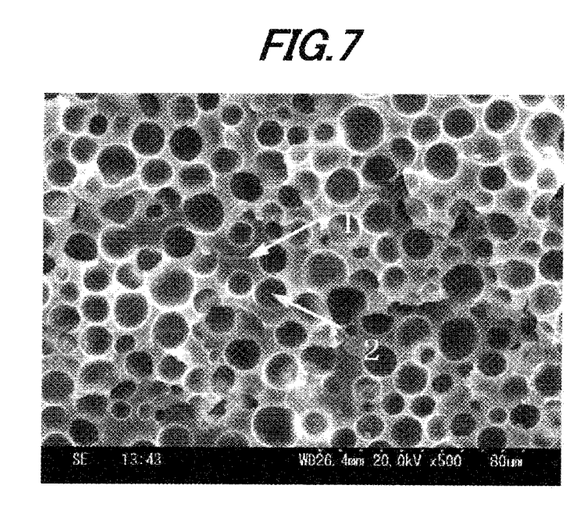
FIG. 7 is a 500 times-magnified microscopic photograph showing a 200 μm-thick film cross section fabricated in Example 4 according to the invention.

This electron microscopic photograph is shown in FIG. 7.

EXAMPLE 5

64 parts by wt. of aqueous absorptive polymer is added to 100 parts by wt. of resin composition A, followed by heating at 50° C., stirring and dispersing at 500 rpm for 30 min, and subsequent processing at 130 MPa pressure, 1 time, using a high-pressure homogenizer (PANDA 2K TYPE from NiroSoavi Inc.), resulting in aqueous absorptive polymer-containing resin composition 5.

It is verified that the resin composition 5 has good film moldability. This resin composition 5 is heated for 5 min using a microwave heater (oscillatory frequency 2.45 GHz), followed by electron microscope observation of its cross section, which verifies that many pores are formed therein. For 3 films thereof, it is verified that the porosities obtained from film volume and weight after complete dehydration are 34%, 34.7%, and 35.1%, respectively, which substantially equal the water content. Also, for a 200 μm film thereof, cavity resonance measurement of its dielectric constant shows 1.96 (@ 10 GHz). Further, for pores observed in an electron microscope photograph of 5 cross-section portions of the 200-μm film, a/b measurement verifies that any of the pores formed has not more than 2, and is dispersed in a substantially spherical shape. The average pore diameter obtained from the cross-section photograph by the image-processing software is 14.7 and the standard deviation is 6.

Subsequently, a conductor 48 AWG (7/0.013 S-MF-AG alloy wire, from Hitachi Cable, Ltd.) is covered with the resin composition 5 in a pressure coating tank at the speed of 50 m/min, followed by curing thereof in an ultraviolet-applying furnace (6 kW, 2 lamps from EYEGRAPHICS, Inc.), and subsequent thermal dehydration in a waveguide microwave heating furnace and an infrared heating furnace, resulting in 50 μm- and 100 μm-thick-sheath electric cables. Cross-section observation thereof verifies that many pores are formed in the insulating sheath layer, and also that the porosities calculated from sheath layer volume and weight per 1 m are 33.2%, and 34%, respectively, which substantially equal the film results. Further, for pores observed in an electron microscope photograph of 5 cross-section portions of the insulating sheath layer, a/b measurement verifies that any of the pores formed has not more than 2, and is dispersed in a substantially spherical shape.

COMPARATIVE EXAMPLE 1

64 parts by wt. of aqueous absorptive polymer processed at 40 MPa pressure, 1 time, using a high-pressure homogenizer (PANDA 2K TYPE from NiroSoavi Inc.) is added to 100 parts by wt. of resin composition A, followed by heating at 50° C. and stirring and dispersing at 500 rpm for 30 min, resulting in aqueous absorptive polymer-containing resin composition 6.

It is verified that the resin composition 6 has film moldability. This resin composition 6 is heated for 5 min using a microwave heater (oscillatory frequency 2.45 GHz), followed by electron microscope observation of its cross section, which verifies that many pores are formed in a 200-μm film, but that there are almost no pores in a 50-μm film, and that there are few pores in a 100-μm film as well. For the 3 films, the porosities obtained from film volume and weight after complete dehydration are totally different from the water content, except the 200-μm film. Also, for the 200 μm film, cavity resonance measurement of its dielectric constant shows 1.96 (@ 10 GHz). Further, for pores observed in an electron microscope photograph of 5 cross-section portions of the 200-μm film, a/b measurement verifies that many of the pores exceed 2, and are in an elliptical shape. The average pore diameter obtained from the cross-section photograph by the image-processing software is 24.9 μm, and the standard deviation is 24.

Subsequently, attempts to obtain 50 μm- and 100 μm-thick-sheath electric cables are done in the same manner as in the Examples, but fails to obtain the 50 pin-thick-sheath electric cable due to many broken portions caused. Although the 100 μm-thick-sheath electric cable can be obtained, observation of its cross section shows that only substantially half the number of pores in the Examples are formed in the sheath layer. Further, for pores observed in an electron microscope photograph of 5 cross-section portions of the 100-μm film, a/b measurement verifies that the pores formed exceed 2.

Figure 8:
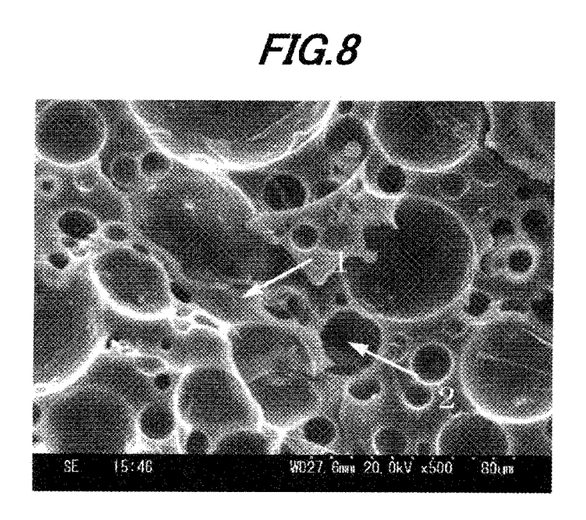
FIG. 8 is a 500 times-magnified microscopic photograph showing a 200 μm-thick film cross section fabricated in Comparative Example 1.

This electron microscopic photograph is shown in FIG. 8.

COMPARATIVE EXAMPLE 2

64 parts by wt. of aqueous absorptive polymer is added to 100 parts by wt. of resin composition A, followed by heating at 50° C. and stirring and dispersing at 500 rpm for 30 min, resulting in aqueous absorptive polymer-containing resin composition 7.

It is verified that the resin composition 7 has film moldability. This resin composition 7 is heated for 5 min using a microwave heater (oscillatory frequency 2.45 GHz), followed by electron microscope observation of its cross section, which verifies that many pores are formed in a 200-μm film, but that there are almost no pores in a 50-μm film, and that there are few pores in a 100-μm film as well. For the 3 films, the porosities obtained from film volume and weight after complete dehydration are very small compared to the Examples. Also, for the 200 μm film, cavity resonance measurement of its dielectric constant shows 2.22 (@ 10 GHz). Further, for pores observed in an electron microscope photograph of 5 cross-section portions of the 200-μm film, a/b measurement verifies that many of the pores exceed 2, and are in an elliptical shape. The average pore diameter obtained from the cross-section photograph by the image-processing software is 137 μm, and the standard deviation is 89.

Subsequently, attempts to obtain 50 μm- and 100 μm-thick-sheath electric cables are done in the same manner as in the Examples, but both fail to obtain the electric cables due to many broken portions caused.

Figure 9:
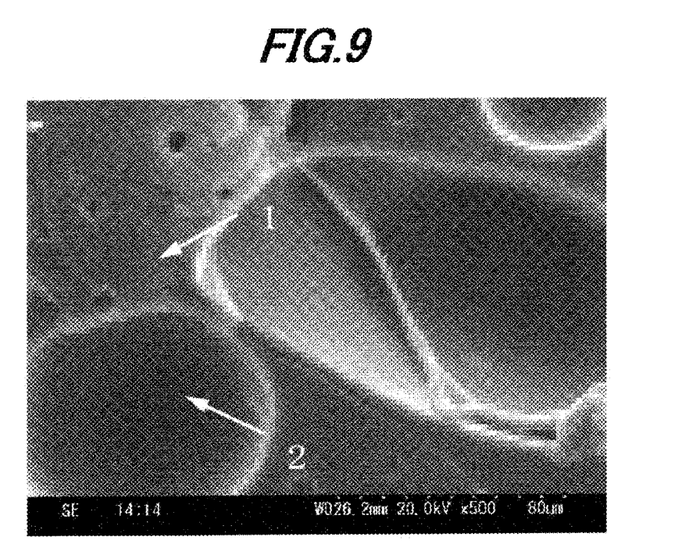
FIG. 9 is a 500 times-magnified microscopic photograph showing a 200 μm-thick film cross section fabricated in Comparative Example 2.

This electron microscopic photograph is shown in FIG. 9.

COMPARATIVE EXAMPLE 3

Using a tetra fluoro ethylene-perfluoro alkyl vinyl ether copolymer resin (PFA) which is a low-dielectric constant thermoplastic polymer, an attempt is done to cause a conductor 48 AWG (7/0.013 S-MF-AG alloy wire from Hitachi Cable, Ltd.) to be covered with a 50 μm-thick sheath extruded by liquid carbon dioxide injection in a 28-mm extruder, but fails to obtain a porous (foamed) electric cable due to many broken portions caused even at a speed of a few m/min.

As explained above, in the Examples, the porous substances or porous-sheath electric cables in which the pore size is homogenous and has few variations are easily obtained by curing and subsequent thermal dehydration of the liquid cross link curable resin composition into which is dispersed the aqueous absorptive polymer milled and microparticulated at an ultrasonic flow pressure of not less than 50 MPa (Examples 1-4), or the aqueous absorptive polymer-doped liquid cross link curable resin composition dispersed at an ultrasonic flow pressure of not less than 50 MPa (Example 5). On the other hand, Comparative Example 1 with a low processing pressure, or Comparative Example 2 with no pressure processing has difficulty in thinning, and large variations in pore size and shape formed. Also, Comparative Example 3 using conventional extrusion has difficulty in high-speed signal transmission.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. An insulated electric cable-producing method, comprising:
   causing a conductor to be covered with the aqueous absorptive polymer-containing resin composition produced by a method in which a resin composition is doped with an aqueous absorptive polymer, comprising:
   causing the aqueous absorptive polymer to absorb and be swollen by water beforehand, and
   milling and microparticulating the water-absorbed and -swollen absorptive polymer at an ultrasonic flow pressure of not less than 50 MPa;
   curing the aqueous absorptive polymer-containing resin composition; and
   subsequently heating the cured aqueous absorptive polymer-containing resin composition to remove moisture in the aqueous absorptive polymer and form an insulating sheath layer.

2. The insulated electric cable-producing method according to claim 1, wherein
   the insulating sheath layer is not more than 100 μm thick, and
   the porosity in the insulating sheath layer is 20%-60%.

3. The insulated electric cable-producing method according to claim 1, wherein
   the cross section of pores formed in the insulating sheath layer is substantially circular,
   its maximum to minimum diameter ratio is not more than 2, and
   the pore diameter D in thickness direction is formed to be $D < \frac{1}{2}t$ where t is the thickness of the insulating sheath layer.

4. The insulated electric cable-producing method according to claim 1, wherein
   the heating uses microwave heating.

5. An insulated electric cable produced by the method according to claim 1.

6. A coaxial cable, comprising:
   the insulated electric cable according to claim 5; and
   a shield layer provided around the insulated electric cable.

7. An insulated electric cable-producing method, comprising:
   causing a conductor to be covered with the aqueous absorptive polymer-containing resin composition produced by a method in which a resin composition is doped with an aqueous absorptive polymer, comprising:
   causing the aqueous absorptive polymer to absorb and be swollen by water beforehand, and
   milling and microparticulating the water-absorbed and -swollen absorptive polymer at an ultrasonic flow pressure of not less than 50 MPa;
   curing the aqueous absorptive polymer-containing resin composition to form an insulating sheath layer; and
   subsequently heating the insulating sheath layer to remove moisture in the aqueous absorptive polymer in the insulating sheath layer and form pores in the insulating sheath layer.

8. The insulated electric cable-producing method according to claim 7, wherein
   the heating uses microwave heating.

9. The insulated electric cable-producing method according to claim 1, further comprising forming a coating layer around the insulating sheath layer.

10. The insulated electric cable-producing method according to claim 7, further comprising forming a coating layer around the insulating sheath layer.

11. An insulated electric cable-producing method according to claim 7, wherein the aqueous absorptive polymer is doped with a liquid cross link curable resin after the aqueous absorptive polymer absorbs and is swollen by water.

* * * * *